US010371533B2

(12) United States Patent
Wilson

(10) Patent No.: US 10,371,533 B2
(45) Date of Patent: Aug. 6, 2019

(54) NAVIGATION DEVICE AND METHOD

(75) Inventor: Christopher Kenneth Hoover Wilson, Emerald Hills, CA (US)

(73) Assignee: TOMTOM GLOBAL CONTENT B.V., Amsterdam (NL)

( * ) Notice: Subject to any disclaimer, the term of this patent is extended or adjusted under 35 U.S.C. 154(b) by 0 days.

(21) Appl. No.: 13/318,846

(22) PCT Filed: Dec. 31, 2009

(86) PCT No.: PCT/US2009/069887
§ 371 (c)(1),
(2), (4) Date: Nov. 4, 2011

(87) PCT Pub. No.: WO2010/128998
PCT Pub. Date: Nov. 11, 2010

(65) Prior Publication Data
US 2012/0053823 A1 Mar. 1, 2012

Related U.S. Application Data

(60) Provisional application No. 61/215,239, filed on May 4, 2009.

(51) Int. Cl.
G01C 21/26 (2006.01)
G08G 1/00 (2006.01)
G01C 21/32 (2006.01)
G08G 1/01 (2006.01)
G08G 1/052 (2006.01)
G08G 1/0968 (2006.01)
(52) U.S. Cl.
CPC ........... *G01C 21/32* (2013.01); *G08G 1/0104* (2013.01); *G08G 1/052* (2013.01); *G08G 1/096844* (2013.01)

(58) Field of Classification Search
CPC .......... G01C 21/20; A61M 5/20; A61M 5/002
USPC ................................. 701/118, 119, 408, 468
See application file for complete search history.

(56) References Cited

U.S. PATENT DOCUMENTS

| 6,850,842 | B2 | 2/2005 | Park |
| 2002/0107634 | A1 | 8/2002 | Luciano |
| 2004/0148099 | A1 | 7/2004 | Kim |
| 2004/0158401 | A1 | 8/2004 | Yoon |
| 2004/0215389 | A1* | 10/2004 | Hirose ............... G01C 21/3461 701/410 |
| 2004/0243298 | A1 | 12/2004 | Knuuttila et al. |

(Continued)

OTHER PUBLICATIONS

International Search Report dated Feb. 23, 2010 for International Application No. PCT/US09/69887.

*Primary Examiner* — Kimberly S Berona
*Assistant Examiner* — Rodney P King

(57) ABSTRACT

Embodiments of the present invention relate to a method of determining speed information, comprising receiving traffic monitoring information navigation devices (610), wherein the traffic monitoring information includes identification information identifying a mobile device (630), location information indicating a geographic locations (910, 920) at which the identification information was received from the mobile device (630), and temporal information indicating times at which the identification information was received, and determining speed information associated with the mobile device from the traffic monitoring information.

13 Claims, 8 Drawing Sheets

(56) References Cited

U.S. PATENT DOCUMENTS

| | | |
|---|---|---|
| 2004/0249560 A1* | 12/2004 | Kim .................. G08G 1/0104 701/117 |
| 2005/0131628 A1 | 6/2005 | Peeters |
| 2007/0005230 A1* | 1/2007 | Sera ..................... G08G 1/01 701/117 |
| 2007/0168118 A1* | 7/2007 | Lappe et al. ................. 701/207 |
| 2007/0225894 A1 | 9/2007 | Tsukamoto |
| 2008/0059050 A1 | 3/2008 | Lin et al. |
| 2008/0068261 A1* | 3/2008 | Hempel ............... G01S 5/0018 342/357.62 |
| 2008/0119212 A1 | 5/2008 | Himmelstein |
| 2009/0210141 A1 | 8/2009 | Young et al. |
| 2009/0271101 A1* | 10/2009 | Relyea ................ G08G 1/0104 701/117 |

\* cited by examiner

NAVIGATION DEVICE AND METHOD

This application is the National Stage of International Application No. PCT/US2009/069887, filed Dec. 31, 2009 and designating the United States. This application also claims priority from U.S. Provisional Application No. 61/215,239, filed on May 4, 2009. The entire contents of these applications are incorporated herein by reference.

FIELD OF THE INVENTION

This invention relates to navigation devices, methods and systems for determining traffic information. In particularly, although not exclusively, embodiments of the invention relate to determining a speed of traffic. Illustrative embodiments of the invention relate to portable navigation devices (so-called PNDs), in particular PNDs that include Global Positioning System (GPS) signal reception and processing functionality. Other embodiments relate, more generally, to any type of processing device that is configured to execute navigation software so as to provide route planning, and preferably also navigation, functionality.

BACKGROUND TO THE INVENTION

Portable navigation devices (PNDs) that include GPS (Global Positioning System) signal reception and processing functionality are well known and are widely employed as in-car or other vehicle navigation systems.

In general terms, a modern PNDs comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the 720T model manufactured and supplied by TomTom International B.V., provide a reliable means for enabling users to navigate from one position to another.

As noted above, route selection may take into account existing, predicted and dynamically and/or wirelessly received traffic and road information, historical information about road speeds to improve the route selection process. Various techniques exist for determining road information, such as information about actual road speeds experienced by drivers. However, these techniques frequently require a support infrastructure to be in place.

It is an aim of the present invention to provide apparatus and methods for determining road and/or traffic information in a lower cost manner. Furthermore, it is desired to improve a density of measurement points of road information.

SUMMARY OF THE INVENTION

Embodiments of the present invention relate to a method of determining speed information, comprising receiving traffic monitoring information navigation devices, wherein the traffic monitoring information includes identification information identifying a mobile device, location information indicating a geographic locations at which the identification information was received from the mobile device, and temporal information indicating times at which the identification information was received, and determining speed information associated with the mobile device from the traffic monitoring information.

In pursuit of this aim, a presently preferred embodiment of the present invention provides a method of determining speed information, comprising receiving first traffic monitoring information from a first navigation device, wherein the first traffic monitoring information includes identification information identifying a mobile device, location information indicating a first geographic location at which the identification information was received from the mobile device, and temporal information indicating a time at which the identification information was received; receiving second traffic monitoring information from second navigation device, wherein the second traffic monitoring information includes identification information identifying the mobile device, location information indicating a second geographic location at which the identification information was received from the mobile device, and temporal information indicating a time at which the identification information was received; and determining speed information from the first and second traffic monitoring information.

A further preferred embodiment of the invention provides a navigation device, comprising a wireless communication device for receiving data; and a location determining means for determining a geographic location of the device; wherein the navigation device includes a traffic monitoring module arranged to receive, via the wireless communication device, identification information from a mobile device, to determine location information indicating a geographic location at which the identification information is received, and temporal information indicating the time at which the identification information is received.

Another embodiment of the invention provides a system, comprising a navigation device, comprising a wireless communication device for receiving data; and a location determining means for determining a geographic location of the device; wherein the navigation device includes a traffic monitoring module arranged to receive, via the wireless communication device, identification information from a mobile device, to determine location information indicating a geographic location at which the identification information is received, and temporal information indicating the time at which the identification information is received, and a server communicatively couplable to the one or more navigation devices to receive the identification information, location information and temporal information, wherein the server is arranged to determine speed information associated with the mobile device according to the received information.

Yet another embodiment of the present invention relates to computer software comprising one or more software modules operable, when executed in an execution environment, to cause a processor to provide a method of determining speed information, comprising receiving first traffic monitoring information from a first navigation device, wherein the first traffic monitoring information includes identification information identifying a mobile device, location information indicating a first geographic location at which the identification information was received from the mobile device, and temporal information indicating a time at which the identification information was received; receiving second traffic monitoring information from second navigation device, wherein the second traffic monitoring information includes identification information identifying the mobile device, location information indicating a second geographic location at which the identification information was received from the mobile device, and temporal information indicating a time at which the identification information was received; and determining speed information from the first and second traffic monitoring information.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF PREFERRED EMBODIMENTS

Preferred embodiments of the present invention will now be described with particular reference to a PND. It should be remembered, however, that the teachings of the present invention are not limited to PNDs but are instead universally applicable to any type of processing device that is configured to execute navigation software so as to provide route planning and navigation functionality. It follows therefore that in the context of the present application, a navigation device is intended to include (without limitation) any type of route planning and navigation device, irrespective of whether that device is embodied as a PND, a navigation device built into a vehicle, or indeed a computing resource (such as a desktop or portable personal computer (PC), mobile telephone or portable digital assistant (PDA)) executing route planning and navigation software.

Figure 1:
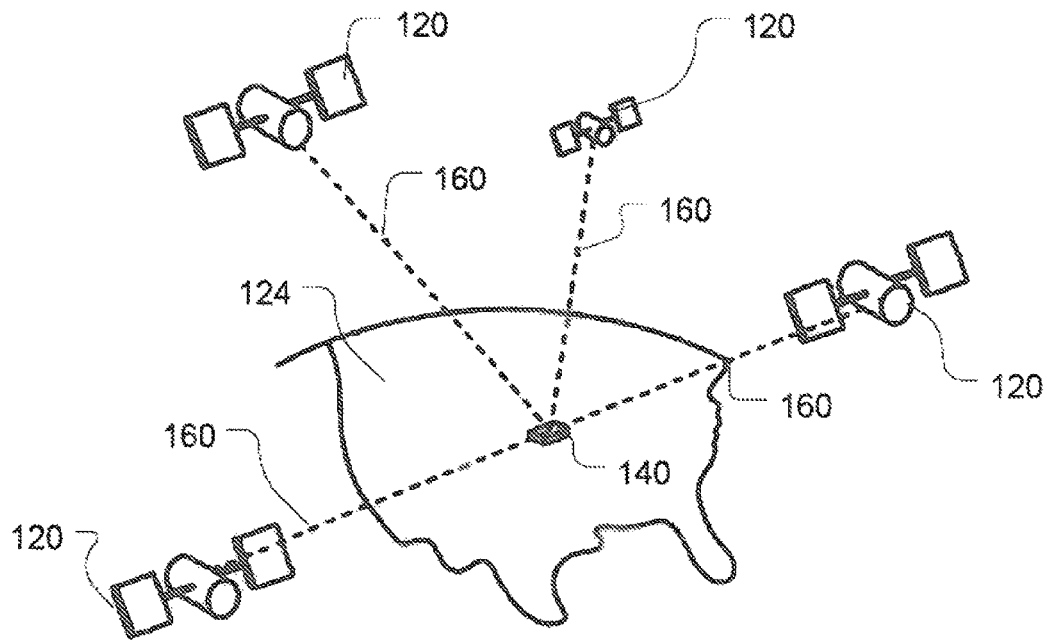
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
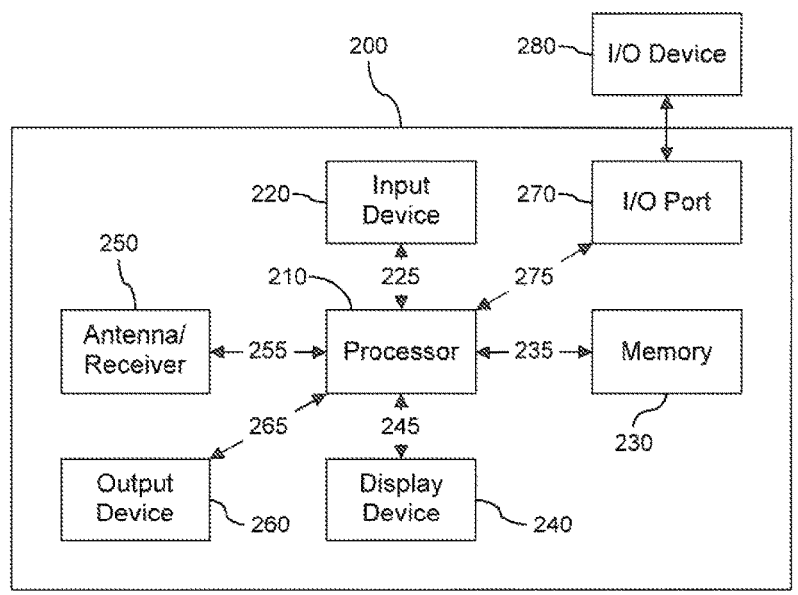
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectible to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
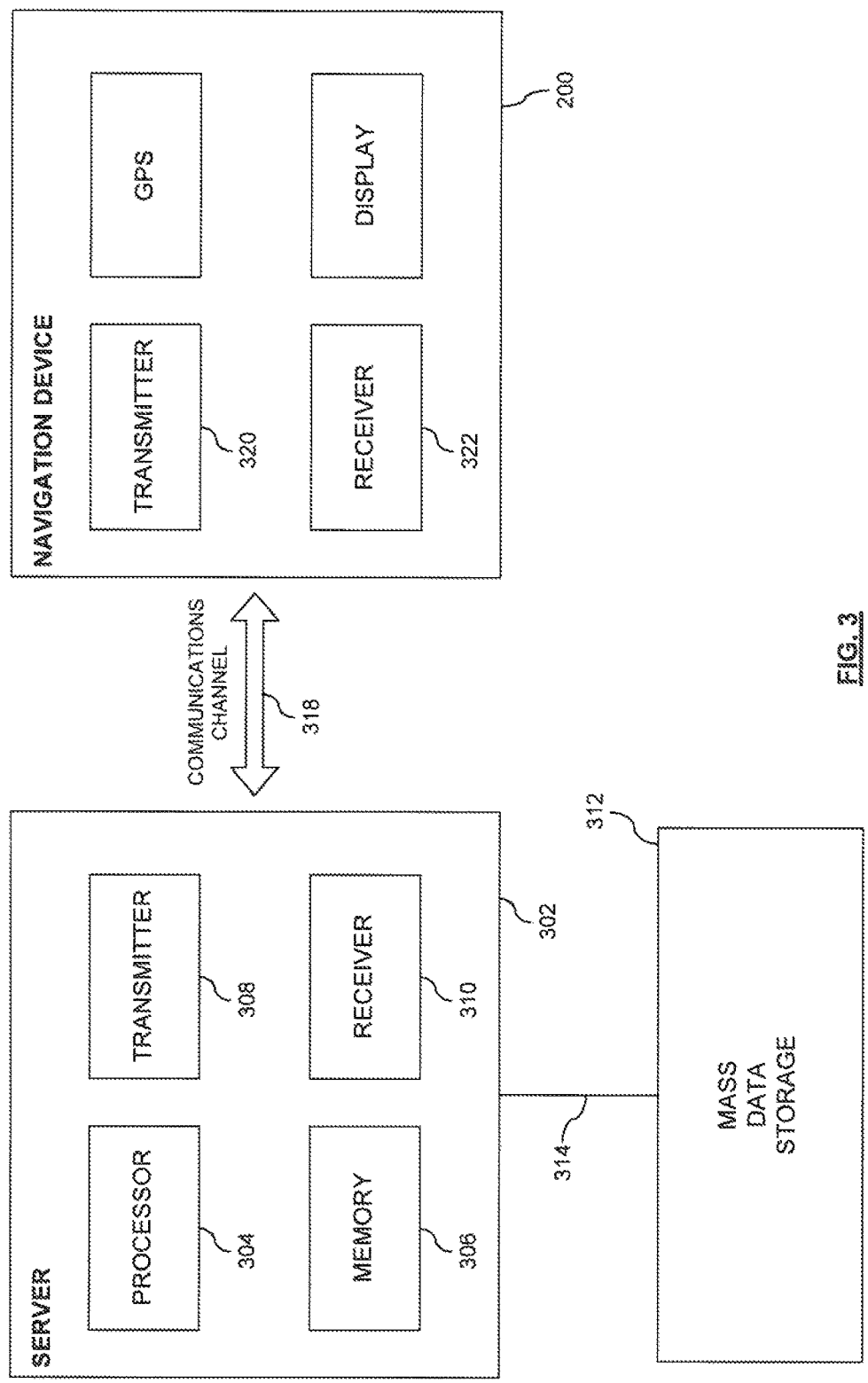
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GPRS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4A:
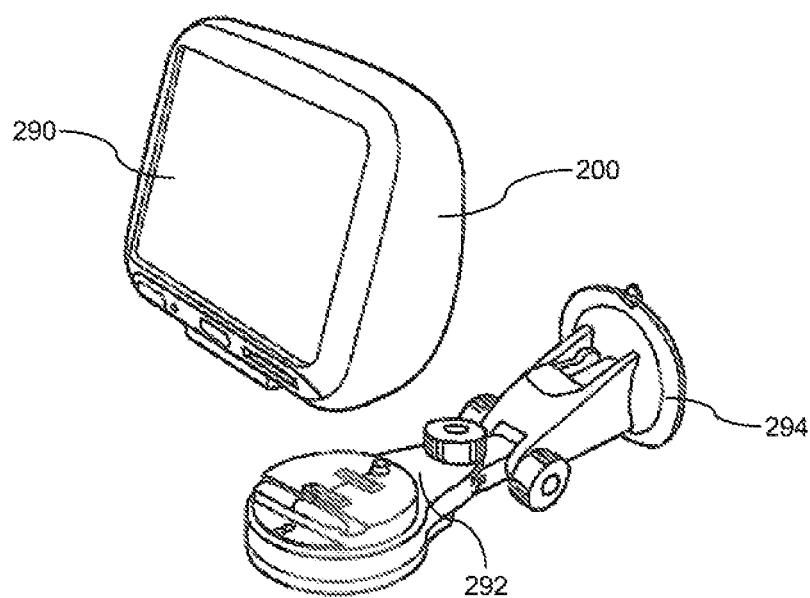
FIGS. 4A and 4B are illustrative perspective views of a navigation device.
Figure 4B:
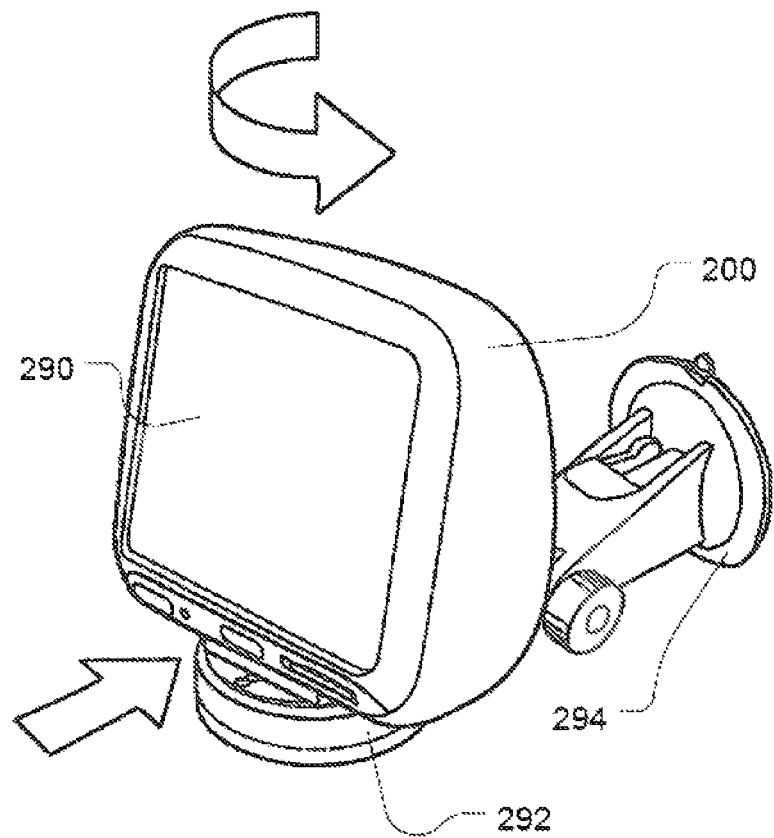

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 292 to the arm 292 for example. The navigation device 200 may then be rotatable on the arm 292, as shown by the arrow of FIG. 4B. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Figure 5:
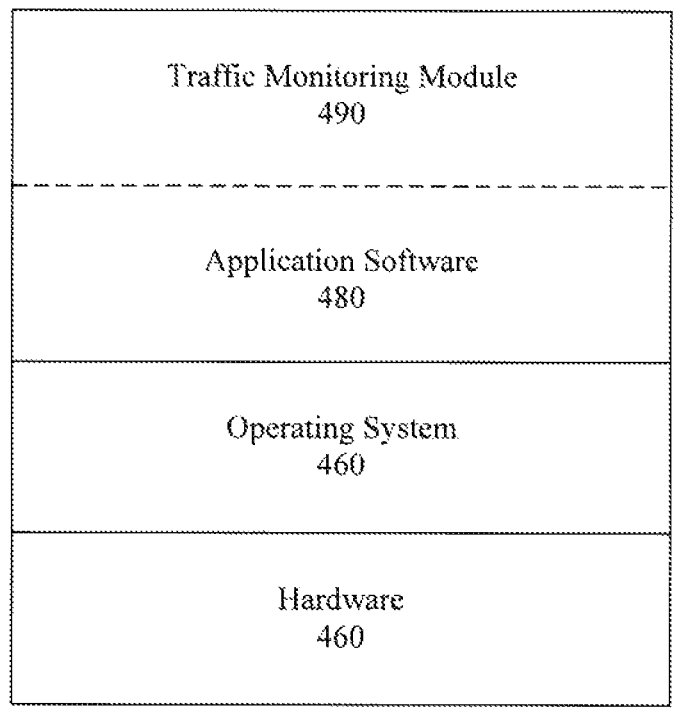
FIG. 5 is a schematic representation of the software employed by the navigation device.

Referring now to FIG. 5 of the accompanying drawings, the memory resource 230 stores a boot loader program (not shown) that is executed by the processor 210 in order to load an operating system 470 from the memory resource 230 for execution by functional hardware components 460, which provides an environment in which application software 480 can run. The operating system 470 serves to control the functional hardware components 460 and resides between the application software 480 and the functional hardware components 460. The application software 480 provides an operational environment including the GUI that supports core functions of the navigation device 200, for example map viewing, route planning, navigation functions and any other functions associated therewith. In accordance with the preferred embodiment of the present invention, part of this functionality comprises a traffic monitoring module 490, the function of which will now be described in detail in connection with the following figures.

The traffic monitoring module 490 of the navigation device 200 facilitates the determination of road information, such as actual road speeds. In some embodiments, the road information is used to support real time distribution of speed information to navigation devices and/or the generation or updating of a database of road information.

The traffic monitoring module (TMM) 490 is configured to wirelessly receive, for example via the I/O port 270, identification information from a mobile electronic device present within or forming part of another vehicle or carried by a person, such as a pedestrian or cyclist. When carried by a person or cyclist, it will be realised that embodiments of the invention may determine a speed of not only vehicular traffic, but also pedestrian or cyclist traffic. The TMM 490 transmits information associated with the identification information, in some embodiments the received identification information itself, location information indicating a geographic location at which the identification information was obtained, and temporal information indicative of a time at which the identification information was received. A server is arranged to receive information from one or more navigation devices 200 having TMMs 490 and, based upon one or more navigation devices 200 having received identification information from the same mobile device at different locations, may determine an average speed of that mobile device between each of the two or more locations. By utilising navigation devices 200 to receive the identification information, a greater density of locations measurements may be made and at lower cost than using fixed-position apparatus, such as base stations.

Figure 6:
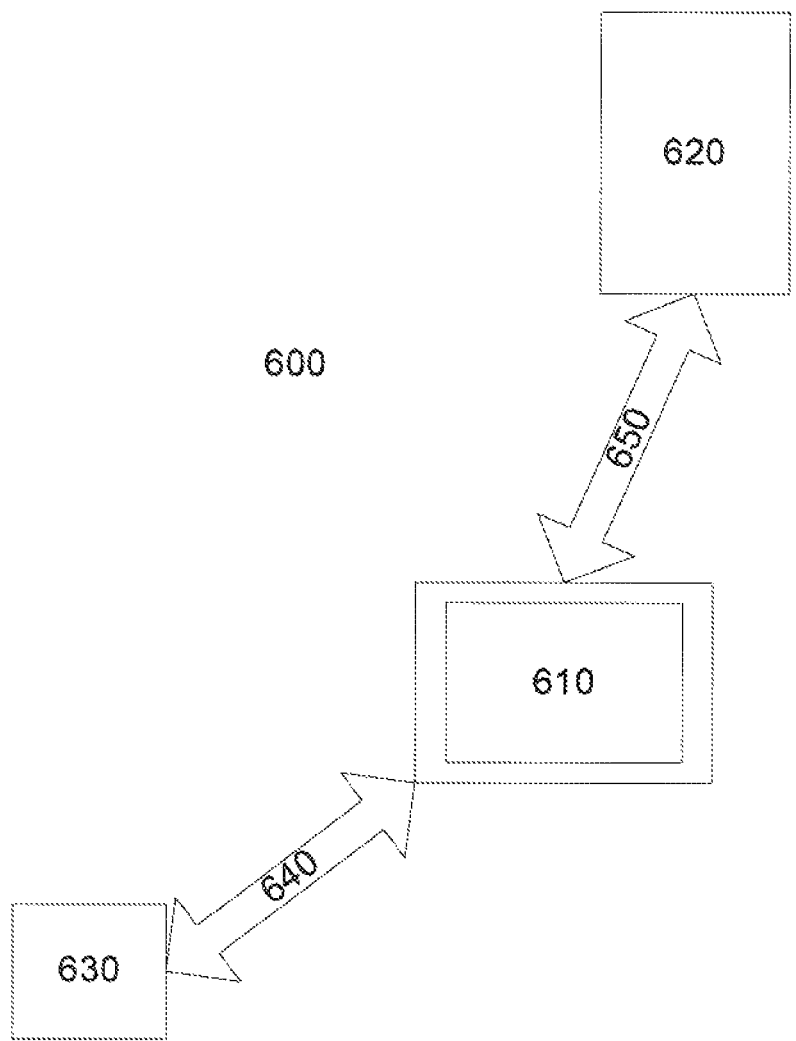
FIG. 6 is an illustration of a system according to an embodiment of the invention.

Referring to FIG. 6, a system 600 according to an embodiment of the invention is shown which comprises a navigation device 610, a server 620 and a mobile device 630. As discussed above, the navigation device 610 includes a TMM 490 and a position determining means, generally a GPS receiver 250, and a communication device for at least periodically establishing a communication channel 650 with the server 620. The server 620 and navigation device 610 are at least in periodic communication via the communication channel 650. The communications channel 650 may be established periodically, e.g. via a host computer connected to the navigation device 610 and the Internet, or wirelessly between the navigation device 610 and server 620 e.g. via a mobile telephone network. The navigation device 610 includes an I/O port 270, as previously discussed with reference to FIG. 2. Using the I/O port 270 the navigation device is configured to communicate with and receive identification information from the mobile device 630 via a wireless communications channel 640. The wireless communications channel 640 is preferably established using a relatively short-range communication protocol, such as Bluetooth or other local communication protocol, as it is desired to determine a geographic location at which the navigation device 610 receives the identification information from the mobile device 630. As a communication range of the channel 640 increases an accuracy of determining the location of identification information reception may reduce.

The mobile device 630 may, in some embodiments, be a device forming part of a larger system, such as a sub-system of in-vehicle electronics, another navigation device, a mobile communication device, such as a mobile phone, PDA etc., or a portable computing device e.g. laptop computer. It will be realised that this list is merely exemplary and the mobile device 630 may be any device capable of wireless communication to transmit identification information to the navigation device 610. The mobile device 630, in some embodiments, supports Bluetooth communication and is operative in a discoverable mode, such that the navigation device 610 may discover the mobile device 630 when in proximity to each other.

The TMM 490 of the navigation device 610 operatively searches or scans for the mobile device 630 i.e. the TMM 490 utilises the I/O port 270 to find the discoverable mobile device 630. Upon detecting wireless communications from the mobile device 630, the TMM 490 causes the mobile device 630 to transmit the identification information which, ideally, uniquely identifies the mobile device 630. In embodiments where the mobile device 610 is a mobile telephone or the like, the identification information may be an IMEI or IMSI number of the mobile device 630; where the mobile device 630 is a computing device the identification information may be a MAC address of the mobile device 630; or a Bluetooth Device ID (DID). It will be realised that other forms of unique or nearly unique device ID may be utilised.

Upon receiving the identification information from the mobile device 630, the TMM 490 of the navigation device

610 is configured to store in its memory 230 location information which is indicative of a geographic location at which the identification information of the mobile device 630 was received. The location information may be obtained via the receiver 250 receiving GPS signals and determining the geographic location of the navigation device 200 there-from. The TMM 490 also stores in the memory 230 temporal information indicating a time at which the location information was received from the mobile device 630. In other embodiments where the navigation device 610 is communicatively coupled to the server 620 when the identification information is obtained from the mobile device 630, the identification, location and temporal information may be communicated or transmitted to the server 620 without first storage in the memory 230 of the navigation device 610.

Figure 7:
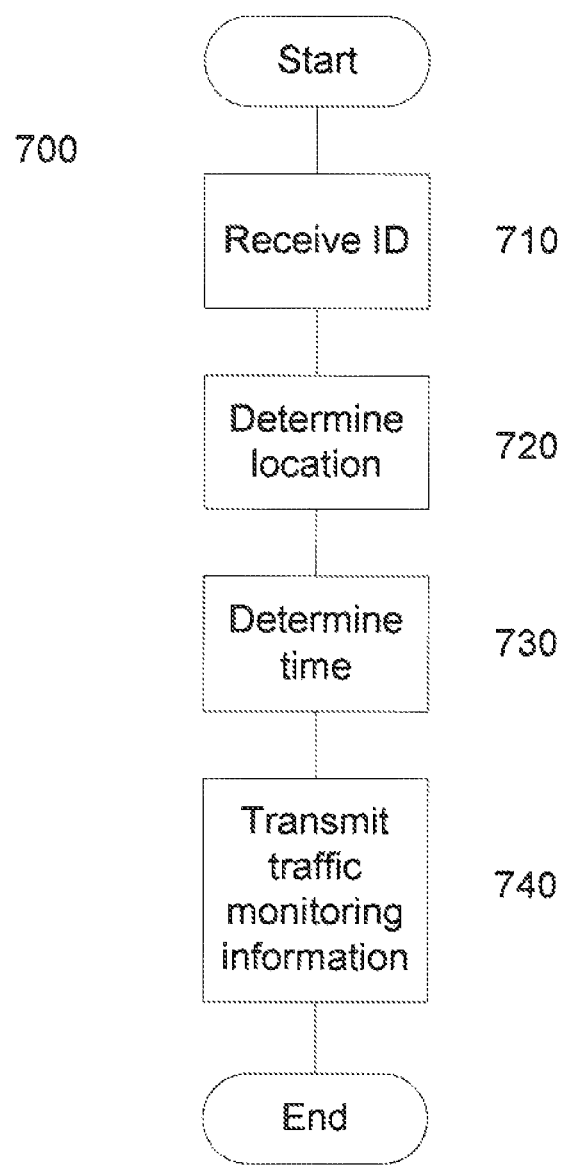
FIG. 7 is an illustration of a method according to an embodiment of the invention.

A method 700 according to an embodiment of the invention will now be explained with reference to FIG. 7. The method comprises a step 710 in which the identification information is received from the mobile device 630. As noted previously, the identification information may be communicated from the mobile device 630 to the navigation device 610 via a relatively short-range communication protocol, such as Bluetooth, although it will be realised that other protocols may be used. In step 720 a geographic location of receiving the identification information is determined. The location may be specified in a coordinate system, such as longitude and latitude. In step 730 a time of obtaining the identification information is determined. The time may be determined from an internal clock of the navigation device 610, or transmitted from the mobile device 630 with the identification information. The identification information, location information and time information may be stored in a data structure which associates the information, such as an array-type data structure. In step 740 the information, which may be stored in the data structure, is transmitted to the server 620. The information may be transmitted substantially immediately after determination by the TMM 490, or may be transmitted when the navigation device 610 is next communicatively coupled to the server 620 e.g. when the navigation device 610 is connected to a host computer. As a result of the method 700, the server 620 has accessible traffic monitoring information identifying the mobile device 630, the location and time at which the navigation device 610 was in communication with the mobile device 630.

Figure 8:
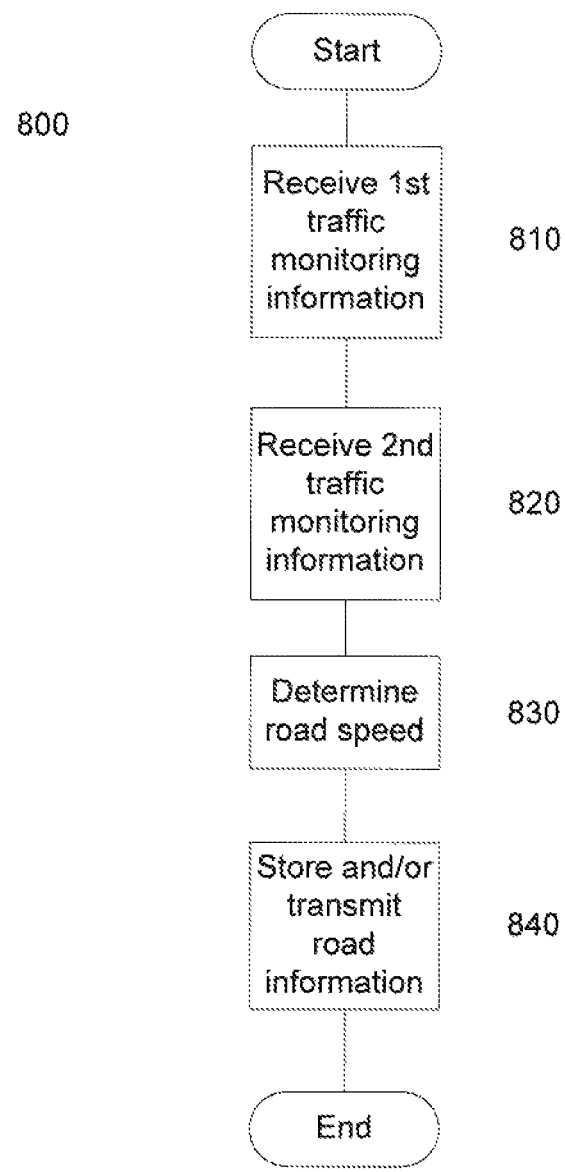
FIG. 8 is an illustration of another method according to an embodiment of the invention.

FIG. 8 illustrates a further method 800 according to an embodiment of the invention. The method 800 may be performed by the server 620. The method 800 may determine speed information associated with one or mobile devices and more transport paths, such as a road segment, based on movement of the mobile device 630 around a transport network, such as a road network.

Figure 9:
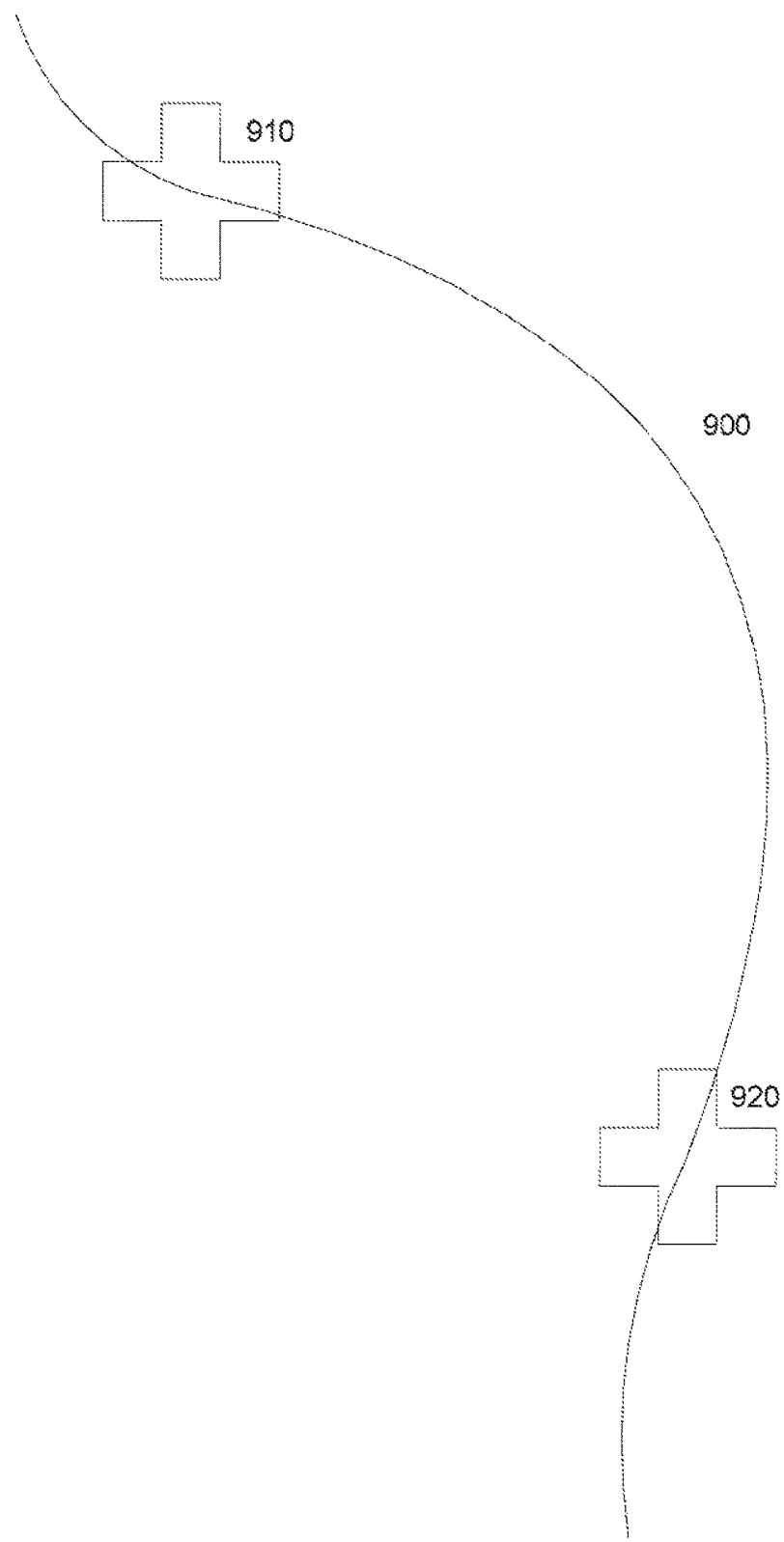
FIG. 9 is an illustration of a road segment and geographic locations at which identification information is received according to an embodiment of the invention.

The method 800 comprises a step 810 in which first traffic monitoring information is received from a first navigation device 610. The first traffic monitoring information may be received as a result of the method shown in FIG. 7. The first traffic monitoring information includes one or more sets of identification information received from one or more mobile device(s) 630 and associated location and temporal information. In step 820 second traffic monitoring information is received from a second navigation device 610. The second traffic monitoring information includes one or more sets of identification information received from one or more mobile device(s) 630 and associated location and temporal information. In step 830, a speed of travel of one or more mobile devices 630 is determined, based on the received first and second traffic monitoring information. The speed of the one or more mobile devices 630 may be determined by identifying, from the first and second traffic monitoring information, locations and times at which the navigation devices 610 received identification information from each mobile device 630. For example, referring to FIG. 9, a road segment 900 is illustrated along which a first navigation device 610 encountered a particular mobile device 630 and received identification information there-from. The first traffic monitoring information 910 indicates a location along the road segment 900 at which the navigation device 610 received the information identifying the mobile device 630, and also the time at which the information was received. The second traffic monitoring information further identifies a second location 920 at which identification information was received from the same mobile device 630, and a time of receiving that information. Based on the first and second traffic monitoring information, an average speed of the mobile device 630 between the first and second locations 910, 920 may be determined. The average speed may be determined by:

$$AvgSpeed = \frac{\Delta dist}{\Delta time}$$

Where Δdist is a distance between the first and second locations 910, 920 along the road segment 900 and Δtime is a change in time or period between the reception of the identification from the mobile device 630 at the first and second locations 910, 920. In this way, an average speed of travel between the first and second locations 910, 920 along the road segment 900 may be determined. The server 620 may store the determined speed information in a database (not shown) in order to improve a quality of route calculation. For example, rather than basing route calculation on estimated speeds for road segments 900, the route calculation may be based on observed speeds between the first and second locations 910, 920. The speed information may be stored in the database associated with time information indicating the time at which the speed of travel was observed. A plurality of average speeds may be stored in the database associated with the road segment which indicate average speeds at each of a plurality of times, thereby indicating how average speeds along the road segment vary according to time. In some embodiments, the speed information may be communicated to one or more navigation devices in substantially real time by the server 620 to assist in route guidance by the navigation device i.e. a route may be recalculated if an observed speed along a road segment is reduced.

It will be apparent from the foregoing that the teachings of the present invention provide an arrangement whereby speed information around a transport network is observed by devices which are mobile around the network. Observations of other mobile devices are made which allows a speed of travel of those mobile devices around the transport network to be determined. Embodiments of the invention do not require a fixed infrastructure and, furthermore, the use of mobile devices allows a greater density i.e. number of location observations to be made.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A method of determining speed information for a mobile device based on traffic monitoring information received from a first navigation device and a second navigation device, wherein the mobile device, first navigation device, and second navigation device are different devices, the method comprising:
   receiving, by a server, first traffic monitoring information from the first navigation device, the first traffic monitoring information including:
      identification information that particularly identifies the mobile device, the identification information having been directly received by the first navigation device from the mobile device,
      first location information indicating a first geographic location of the first navigation device when the identification information was received from the mobile device, the first navigation device having acquired the first location information from a position sensing system in the first navigation device based on the receipt of the identification information from the mobile device, and
      first temporal information indicating a first time at which the identification information was received by the first navigation device;
   receiving, by the server, second traffic monitoring information from the second navigation device, the second traffic monitoring information including:
      the identification information that particularly identifies the mobile device, the identification information having been directly received by the second navigation device from the mobile device,
      second location information indicating a second geographic location of the second navigation device when the identification information was received from the mobile device, the second navigation device having acquired the second location information from a position sensing system in the second navigation device based on the receipt of the identification information from the mobile device, and
      second temporal information indicating a second time at which the identification information was received by the second navigation device;
   using, by the server, the first traffic monitoring information and the second traffic monitoring information to compute speed information for the mobile device, the speed information representing a speed of travel of the mobile device between the first geographic location and the second geographic location;
   storing, by the server, the speed information in a map database, the speed information being associated with one or more road segments in the database; and
   providing, by the server to a third navigation device, traffic speeds on the one or more road segments at corresponding times for use by the third navigation device in performing one or more route guidance operations during which a user is presented with one or more route instructions that are determined based on the traffic speeds, wherein the traffic speeds are determined based on the stored speed information in the map database.

2. The method of claim 1, comprising:
   receiving, at the first navigation device, the identification information from the mobile device; and
   receiving, at the second navigation device, the identification information from the mobile device.

3. The method of claim 1, wherein the identification information is received from the mobile device using a relatively short range wireless communication protocol.

4. The method of claim 1, wherein the speed information is determined according to:

$$\text{Speed} = \Delta\text{dist}/\Delta\text{time}$$

where $\Delta$dist is a distance between the first geographic location and the second geographic location and $\Delta$time is a change in time between the first time and the second time.

5. The method of claim 1, wherein the speed information is average speed information associated with one or more road segments.

6. A computer program product comprising computer executable instructions which, when executed by a computer, implement the method of claim 1.

7. A system that determines speed information for a mobile device based on traffic monitoring information received from a first navigation device and a second navigation device, wherein the mobile device, first navigation device, and second navigation device are different devices, the system comprising:
   a server communicatively couplable to the first navigation device and second navigation device, the server being configured to:
      receive first traffic monitoring information from the first navigation device, the first traffic monitoring information including:
         identification information that particularly identifies the mobile device, the identification information having been directly received by the first navigation device from the mobile device,
         first location information indicating a first geographic location of the first navigation device when the identification information was received from the mobile device, the first navigation device having acquired the first location information from a position sensing system in the first navigation device upon receiving the identification information from the mobile device, and first temporal information indicating a first time at which the identification information was received by the first navigation device;

receive second traffic monitoring information from the second navigation device, the second traffic monitoring information including:

the identification information that particularly identifies the mobile device, the identification information having been directly received by the second navigation device from the mobile device, second location information indicating a second geographic location of the second navigation device when the identification information was received from the mobile device, the second navigation device having acquired the second location information from a position sensing system in the second navigation device upon receiving the identification information from the mobile device, and second temporal information indicating a second time at which the identification information was received by the second navigation device;

use the first traffic monitoring information and the second traffic monitoring information to compute speed information for the mobile device, the speed information representing a speed of travel of the mobile device between the first geographic location and the second geographic location;

store the speed information in a map database, the speed information being associated with one or more road segments in the database; and provide, to a third navigation device, traffic speeds on the one or more road segments at corresponding times for use by the third navigation device in performing one or more route guidance operations during which a user is presented with one or more route instructions that are determined based on the traffic speeds, wherein the traffic speeds are determined based on the stored speed information in the map database.

8. The system of claim 7, wherein the server determines the speed information according to:

$$Speed = \Delta dist / \Delta time$$

where $\Delta dist$ is a distance between the first geographic location and the second geographic location and $\Delta time$ is a change in time between the first time and the second time.

9. The system of claim 7, wherein the mobile device is one of: an in-vehicle electronic device, a navigation device or a mobile communication device.

10. The system of claim 7, wherein the server is further configured to use the speed information instead of an average speed in a route calculation between the first geographic location and the second geographic location.

11. The system of claim 7, wherein the identification information identifies the mobile communication device.

12. The system of claim 11, wherein the identification information is one of: an IMEI number, an IMSI number, a MAC address or a Bluetooth Device ID.

13. The system of claim 7, wherein the mobile device is carried by a pedestrian or cyclist.

* * * * *